US007309729B1

(12) United States Patent
Weese et al.

(10) Patent No.: US 7,309,729 B1
(45) Date of Patent: Dec. 18, 2007

(54) AQUEOUS ADDITIVE SYSTEMS FOR POLYMERIC MATRICES

(75) Inventors: Richard Henry Weese, Washington Crossing, PA (US); Chuen-Shyong Chou, Lower Gwyneed, PA (US); Eugene Patrick Dougherty, Langhorne, PA (US); Jean Marie Brady, Maple Glen, PA (US); David John McDonald, Fairless Hills, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/520,249

(22) Filed: Mar. 7, 2000

(51) Int. Cl.
*C08F 290/04* (2006.01)

(52) U.S. Cl. .................................... 524/504

(58) Field of Classification Search ................. 524/504
See application file for complete search history.

(56) References Cited

U.S. PATENT DOCUMENTS

| | | | |
|---|---|---|---|
| 2,935,763 A | 5/1960 | Newman et al. | |
| 3,067,162 A | 12/1962 | Went et al. | |
| 3,228,790 A | 1/1966 | Sexsmith et al. | |
| 3,251,904 A | 5/1966 | Souder et al. | |
| 3,624,015 A * | 11/1971 | Vaughn | 260/28.5 |
| 3,642,676 A | 2/1972 | Saunders et al. | |
| 3,644,576 A | 2/1972 | Sehm | |
| 3,671,610 A | 6/1972 | Amagi et al. | |
| 3,796,677 A | 3/1974 | Laber et al. | |
| 3,813,259 A | 5/1974 | Neubert | |
| 3,833,686 A | 9/1974 | Grochowski et al. | |
| 3,859,389 A | 1/1975 | Carty et al. | |
| 3,864,432 A | 2/1975 | Adler et al. | |
| 3,969,431 A | 7/1976 | Gallagher | |
| 4,040,996 A | 8/1977 | Van Vonno | |
| 4,040,997 A | 8/1977 | Vonno et al. | |
| 4,110,843 A | 8/1978 | Skidmore | |
| 4,163,838 A | 8/1979 | Kalka | |
| 4,191,678 A | 3/1980 | Smith | |
| 4,272,424 A | 6/1981 | Kitamura et al. | |
| 4,384,077 A | 5/1983 | Gift | |
| 4,694,042 A | 9/1987 | McKee et al. | |
| 4,794,142 A | 12/1988 | Alberts et al. | |
| 4,822,856 A | 4/1989 | Moore et al. | |
| 4,880,877 A | 11/1989 | Sugimori et al. | |
| 4,921,909 A | 5/1990 | Sugimori et al. | |
| 4,923,923 A | 5/1990 | Struss et al. | |
| 5,100,949 A * | 3/1992 | Takahashi | 524/459 |
| 5,153,029 A | 10/1992 | Sharma | |
| 5,204,022 A | 4/1993 | Sharma | |
| 5,276,092 A | 1/1994 | Kempner et al. | |
| 5,284,905 A * | 2/1994 | Chen | 524/710 |
| 5,290,858 A * | 3/1994 | Sasaki | 525/64 |
| 5,308,648 A | 5/1994 | Prince et al. | |
| 5,321,056 A | 6/1994 | Carson et al. | |
| 5,334,644 A | 8/1994 | Gose et al. | |
| 5,442,012 A * | 8/1995 | Kempner | 525/71 |
| 5,506,307 A | 4/1996 | Memon | |
| 5,534,594 A | 7/1996 | Troy et al. | |
| 5,583,173 A * | 12/1996 | Gujarathi | 524/458 |
| 5,612,413 A | 3/1997 | Rozuszka et al. | |
| 5,708,132 A * | 1/1998 | Grimm | 528/487 |
| 5,729,911 A | 3/1998 | Kelleher et al. | |
| 5,762,846 A | 6/1998 | Blankenbeckler et al. | |
| 5,780,549 A * | 7/1998 | Ludwig | 525/84 |
| 5,817,266 A | 10/1998 | Guntherberg et al. | |
| 5,852,113 A | 12/1998 | Guntherberg et al. | |
| 5,872,189 A * | 2/1999 | Bett | 525/243 |
| 5,907,027 A | 5/1999 | Spilman et al. | |
| 5,910,276 A | 6/1999 | Guntherberg et al. | |
| 5,958,316 A | 9/1999 | Guntherberg et al. | |
| 5,985,993 A * | 11/1999 | Lee | 524/832 |
| 6,001,913 A * | 12/1999 | Thames | 524/398 |
| 6,036,869 A * | 3/2000 | Selvarajan | 210/733 |
| 6,043,293 A * | 3/2000 | Belik | 521/134 |
| 6,043,319 A * | 3/2000 | Lee | 525/301 |
| 6,114,415 A * | 9/2000 | Bertelo | 523/335 |
| 6,153,692 A | 11/2000 | Liesenfelder et al. | |
| 6,224,981 B1 * | 5/2001 | Richard | 428/407 |
| 6,235,810 B1 * | 5/2001 | Pavlyuchenko | 523/201 |

FOREIGN PATENT DOCUMENTS

| | | |
|---|---|---|
| DE | 197 35 477 A1 | 2/1999 |
| EP | 455092 A2 | 11/1991 |
| EP | 488984 A2 | 6/1992 |
| EP | 534235 A1 | 3/1993 |
| EP | 598603 A1 | 5/1994 |

(Continued)

OTHER PUBLICATIONS

Grigorova, E. et al., *European Polym. J.* 34(9) 1391-1393 (1998).

(Continued)

*Primary Examiner*—Edward J. Cain
(74) *Attorney, Agent, or Firm*—Carl P. Hemenway

(57) ABSTRACT

Aqueous-form additive systems, and methods of blending the same with a matrix resin, are disclosed whereby acrylic-based impact modifier compositions, butadiene-based impact modifier compositions and acrylic-based processing aids are used in aqueous form without the need for isolation to the traditional powder-form. The aqueous additive systems of the present invention provide a means for the design of novel additive compositions. The aqueous additive systems of the present invention also provide a great degree of flexibility in preparation of matrix resin blends and formulations. Additionally, the aqueous additive systems of the present invention allow for the reduced cost of manufacturing additives and reduced cost in blending matrix resin formulations.

7 Claims, No Drawings

FOREIGN PATENT DOCUMENTS

| | | |
|---|---|---|
| EP | 0 890 593 | 1/2003 |
| GB | 1159689 | 7/1969 |
| GB | 1230185 | 4/1971 |
| JP | 08-151499 A | 6/1996 |
| SU | 580714 | 6/1978 |
| WO | 98/13412 | 4/1998 |
| WO | 98/30619 | 7/1998 |

OTHER PUBLICATIONS

M. Schneider, T. Pith, M. Lambla (Strasbourg, France), "Toughening of Polystyrene by Natural Rubber-Based Composite Particles. Part I. Impact Reinforcement by PMMA and PS grafted Core-Shell Particles", *J. Materials Science*, 32, 6331-6342 (1997).

M. Schneider, T. Pith, M. Lambla (Strasbourg, France), "Toughening of Polystyrene by Natural Rubber-Based Composite Particles. Part II. Influence of the Internal Structure of PMMA and PS grafted Core-Shell Particles", *J. Materials Science*, 32, 6343-6356 (1997).

Dialog File No. 351 Accession No. 12265935, Derwent World Patents Inde Abstract, Jan. 1999.

Dialog File No. 351 Accession No. 12193303, Derwent World Patents Inde Abstract, Dec. 1998.

M. Schneider, T. Pith and M. Lambla, "Toughening of Polystyrene by Natural Rubber-Based Composite Particles. Part I. Impact Reinforcement by PMMA and P grafted Core-Shell Particles", J. Materials Science, 32, 6331-6342 (1997).

M. Schneider, T. Pith and M. Lambla (Strasbourg, France), "Toughening of Polystyrene by Natural Rubber-Based Composite Paricles. Part II. Influence the Internal Structure of PMMA and PS grafted Core-Shell Particles", J. Materials Science, 32, 6343-6356 (1997).

European Patent Office Search Report for EP Patent Application 00301331.5-2109- received Jul. 10, 2000.

\* cited by examiner

AQUEOUS ADDITIVE SYSTEMS FOR POLYMERIC MATRICES

BACKGROUND

Numerous molded articles and films are manufactured from one or more of a variety of polymeric resins. Typically, these resins must be blended with other, "additive" components to enable the production of an end-use material having specified physical, chemical, and/or mechanical characteristics. Thus, for example, it is well-known that the impact properties of resins such as poly(vinyl chloride) ("PVC") can be markedly improved through the addition of compounds such as core-shell polymers: These include acrylic impact modifiers ("AIMs") as well as methyl methacrylate-butadiene-styrene ("MBS") modifiers. AIMs have cores based on alkyl acrylates, while MBS modifiers have cores consisting largely of butadiene-styrene copolymers or butadiene homopolymers. Shells for both types of modifiers usually consist of polymethyl methacrylate homopolymers or methyl methacrylate-styrene copolymers. Similarly, it is known that the ability to process resins such as PVC to form films or end-use molded articles can be enhanced or enabled through the addition of compounds such as polymeric (typically methyl methacrylate-based) processing aids ("PAs").

Such additives are typically made by emulsion polymerization and then dried to a powder form before being blended with the polymeric resin substrate/matrix. Thus, the ability to isolate a composition has been an accepted limitation upon the selection of new additive compositions. Typically, this limitation is addressed through the use of multistaged polymer compositions, where the outer-stage shells have a relatively high Tg (sometimes referred to as being "hard") to provide isolation capabilities, while the inner stages (e.g. the "rubbery" cores) provide much of the functionality. Alternatives to the traditional powder-form additive systems have been proposed—but none have proven particularly viable, and many relate to additives other than AIM, MBS or PA type additives.

U.S. Pat. No. 3,864,432 describes the combination of ethylene/vinyl acetate copolymer latexes with polymeric resins such as PVC, PVC/vinyl acetate, and polyethylene to achieve pourable powders of elastomer-treated thermoplastics. The only "additive" systems exemplified by this patent relate to ethylene/vinyl acetate elastomers. While this patent teaches that PVC mixed with the ethylene/vinyl acetate latexes results in a pourable powder (the object of the invention), the patent fails to describe any impact performance (if any) resulting from the use of the latexes.

U.S. Pat. No. 3,067,162 teaches the combination of dilute aqueous dispersions of resin matrix with aqueous dispersions of plasticizers, such as diethylhexylphthalate. The plasticizer is then slowly absorbed by the resin particles. The resin/plasticizer granules are then separated from the aqueous phase by filtration, and dried by conventional methods. The process taught in this patent is slow and requires a number of additional steps beyond mixing the components as originally made or available: (1) aqueous dispersions of the components (both resin and plasticizer) must be prepared; (2) the removal of substantial amounts of water is required; and (3) after the water is removed the product must be separately dried. Furthermore, this patent does not teach the use of aqueous-form AIM, MBS or PA additives.

U.S. Pat. No. 3,813,259 discloses a process to achieve resin-coated elastomer particles where a dilute resin latex is slowly coagulated onto an elastomeric slurry, within very specific temperature ranges—allowing the resin to fuse both to itself and to the elastomer, without actually melting. This process is time consuming, and requires the use very dilute latexes of the resin (i.e. 0.1 to 8% solids), thus involving the eventual removal of substantial amounts of water. Furthermore, the coagulation process must be carefully monitored to prevent the latex from coagulating as a separate phase rather than as a coating on the elastomeric particles.

In-situ polymerization of matrix resin monomer in presence of a modifier latex is taught in U.S. Pat. No. 4,272,424. Such methods suffer a number of drawbacks. The presence of the modifier latex can adversely affect the polymerization of the matrix monomer, leading to coarse particles and the deposition of polymer scale on the walls of the polymerization reactor. Furthermore, the water that is eventually removed from the reaction mixture can contain varying amounts of unincorporated modifier latex—causing potential environmental problems. Furthermore, such methods do not provide a sufficient degree of flexibility to the matrix resin compounder, who blends the matrix resin in various formulations (depending on the end-use) with various levels of additives.

The "artificial" emulsification of various processing lubricants, stabilizers and fillers, for use in subsequent blending with matrix resins, is taught in references such as U.S. Pat. No. 4,040,997 and U.S. Pat. No. 5,334,644. The additives at issue in these references are not generally made from emulsion techniques, and thus must be obtained in commercially available form (typically solid) and subjected to specific conditions where they are emulsified. These references do not address the use of AIM, MBS or PA compositions, which are ordinarily made in emulsion form and thus require no additional process steps for use in emulsion-form.

U.S. Pat. No. 4,880,877 discloses an elaborate process whereby a latex of a graft rubber polymer can be blended with a thermoplastic resin. The process is elaborate and requires the graft rubber polymer be mixed with an organic solvent; followed by the removal of the aqueous phase from the mixture; followed by the addition of the matrix resin to the organic phase of the mixture; followed by the removal of the organic solvent (and any residual water); followed by still further processing. The disclosed process is cumbersome and involves the use of organic solvents, which can present environmental, health and safety hazards.

EP 735,078 A1 describes a method of producing impact-modified thermoplastics by introducing an emulsion of an elastomeric polymer with a thermoplastic resin in a screw machine. However, rather than combine emulsion-form elastomeric polymers directly with the matrix resin, EP 735,078 teaches that the elastomer emulsion must first be subjected to an elaborate mechanical dewatering process before it can be combined with the matrix resin. Thus, by the time the elastomer emulsion is actually combined with the matrix resin, it has been freed of most of its water and basically exists in a powder form.

Accordingly, an object of the present invention is to provide for the convenient use of aqueous-form AIM, MBS and PA additives. A further object of the present invention is to provide for new additive compositions that would not otherwise be available in powder-form. A further object of the present invention is to provide matrix-resin compounders with a great deal of flexibility in their formulation of end-use blends. A still further object of the present invention is to provide for the reduced cost in the production of AIM, MBS, and PA compositions, and reduced cost in the formulation of matrix resins with additives.

STATEMENT OF INVENTION

The present invention provides a viable alternative to the traditional use of powder-form additives through the use of aqueous additive systems. The use of aqueous additive systems provides several advantages. By eliminating the isolation step in the production of such additive products, the additives can be manufactured in a shorter time at a lower cost. Moreover, the use of aqueous additive systems allows for the design of new and improved modifier compositions, since the polymer designer is no longer constrained by the requirement to isolate dried powder from emulsion. Additionally, the use of aqueous additive systems eliminates dust and compaction problems associated with the handling of powder-form additives. Finally, use of aqueous additive systems provides flexibility for mixing the additive with the resin: the additive can be mixed and dried with the resin still in moist, wet-cake form; it can be blended with other formulation ingredients; or pumped into an extruder or kneader during a compounding step. This flexibility can, in turn, provide still lower-cost processes and/or improved uniformity of mixing.

The present invention provides for an aqueous additive system for direct addition to polymeric matrix resins comprising at least one polymeric additive selected from
  i) polymers comprising, as polymerized units, alkyl acrylates;
  ii) polymers comprising, as polymerized units, alkyl (meth)acrylates;
  iii) polymers comprising, as polymerized units, 1,3-dienes;
  iv) polymers comprising, as polymerized units, aromatic vinyl monomers;
  v) polymers comprising, as polymerized units, acrylonitrile;
wherein the polymeric additive is present in amounts from 5 to 70 percent by weight of the additive system.

The present invention further provides for a method of blending additives with polymeric matrix resins comprising:

A) forming an additive-matrix mixture by contacting the polymeric matrix resins with an aqueous additive system comprising at least one polymeric additive selected from
  i) polymers comprising, as polymerized units, alkyl acrylates;
  ii) polymers comprising, as polymerized units, alkyl (meth)acrylates;
  iii) polymers comprising, as polymerized units, 1,3-dienes;
  iv) polymers comprising, as polymerized units, aromatic vinyl monomers;
  v) polymers comprising, as polymerized units, acrylonitrile;
  wherein the polymeric additive is present in amounts from 5 to 70 percent by weight of the additive system; and B) drying said additive-matrix mixture.

The principal advantage of using aqueous additive systems of the present invention is that expensive energy-intensive isolation procedures (e.g., spray-drying or coagulation/filtering/dewatering/drying) to remove water and form powders, are avoided. Since AIM, MBS, and PA additives are typically used in resin matrix formulations at only 0.1-15 parts (solids based on 100 parts PVC solids), and since these additives are manufactured as aqueous emulsions containing roughly the same amount of water, we have discovered that the frictional heating of mixers, kneaders, and/or extruders can be used to remove the small amount of water present more efficiently than that taught by the present art in the field. Elaborate and expensive isolation procedures, accepted by those skilled in the art as necessary, are in fact not needed since the mixing and drying can be combined into one step.

Ranges specified are to be read as inclusive, unless specifically identified otherwise.

DETAILED DESCRIPTION OF THE INVENTION

The present invention provides for the use of aqueous additive systems that correspond to a number of known additive compositions currently used only in powder form. Under the present invention these additives are blended in aqueous form with the matrix resin, using standard equipment such as high-speed mixers, blenders, kneaders, extruders and/or fluidized drying beds. Other ingredients typically added in blended formulations (e.g., lubricants, thermal stabilizers, waxes, pigments and fillers) would also be added in this same mixing equipment—either in aqueous form, liquid form, or powdered form. When the aqueous additive systems of the present invention are blended with the matrix resin, the water that is contained in the additive system is evaporated as part of the process of heating the blend to the target temperature. Preferably, the mixing equipment would be provided with means (such as vacuum or venting) to remove the water vapor that is evolved during the blending operation.

Both polymer matrices and polymeric-based additives are ordinarily manufactured in reactors. The additive could indeed be "grafted" chemically to the matrix in a reactor. As U.S. Pat. No. 4,163,838 teaches, PVC-acrylic alloys can be obtained by grafting emulsions onto PVC suspensions. However, this procedure limits formulators, who often want to tailor their formulations to add sometimes more or sometimes less additive in their formulations than the chemical grafting allows. The present invention overcomes this shortcoming by providing a number of ways to combine polymer matrices and polymeric-based additives to achieve any desired additive loading. The present invention provides manufacturers, formulators and compounders with enormous flexibility for both polymer designs as well as mixing/compounding methods.

We have discovered that polymer-based additives can be added, in a variety of different forms, to polymer matrices, which may also be in different forms, in different types of equipment. That is, the additive can be placed in the "value chain" at a variety of "entry points". For example, the additive can be added to a polymer matrix when the matrix itself is still only partially dried, as a slurry or wet cake. Upon addition of the additive, the polymer-additive mixture can be mixed in the desired ratio and then dried together using a device like a fluid bed dryer, manufactured by companies such as Aeromatic; or a spray dryer manufactured by companies such as Niro; or similar devices. The additive itself may be in aqueous emulsion form, in coagulated slurry form, or in partially-dried wet cake. It is especially advantageous to carry out this procedure for PVC, because PVC is ordinarily manufactured in aqueous emulsion or suspension polymerization processes, but is still "wet", either after the PVC emulsion has been coagulated or after the PVC suspension has been centrifuged. Surprisingly, we have found that combining additives and polymer matrices in this manner results in several, important advantages over the corresponding mixtures of PVC and additives both in powder form: 1) the residual moisture can be removed safely and efficiently to <0.2%, even when the starting moisture level exceeds 40%; 2) thermal stability is equivalent to that of mixtures of PVC powder and additives in powder form; 3) residual monomer levels remaining from incomplete polymerization processes are removed during this process and thus are lower than expected in the resulting mixture; 4) powder properties (funnel flow, particle size, and bulk density) and thus ease of handling are improved over powder-powder mixtures; and 5) the melt flow rate of the mix is higher than that of powder mixes, providing easier processing.

Polymeric additives—AIM and MBS impact modifiers or PA's—can be added to matrices in special-purpose high-speed blenders, manufactured by companies such as Henschel Inc. and Gonther Papenmeier GmbH & Co. KG. These blenders are operated at high speeds, resulting in frictional heating of the contents of the blender, producing temperatures of about 100° C. where moisture can be removed by simple evaporation. Blender addition is a very convenient "entry point", since in typical formulations involving polymer matrices, many additional ingredients must be added, e.g. thermal stabilizers, lubricants, plasticizers, pigments and fillers are commonly added in PVC formulations. An example of a typical blending formulation sequence is provided below. Again, we find that additives can be added to blenders in aqueous form, either as emulsions, wet cakes or slurries, and either equivalent properties or, in some instances, superior properties can be obtained by this blending procedure. For instance, the addition of the additive in emulsion form to vented blenders can provide improved Gardner impact for subsequently extruded sheets, faster melt flow during the extrusion process, and improved powder properties. When polymeric additives are in emulsion form, we generally find that it is best to add the additive at a lower temperature in the blending sequence, to remove the moisture most rapidly and efficiently. On the other hand, we have found equivalent impact results and thermal stability, regardless of whether emulsions are added at high (82° C.) or low (23° C.) temperatures.

Besides addition of polymeric-based additives in aqueous form to blenders or fluid-bed dryers, polymeric additives can be pumped into compounding devices such as extruders or kneaders. Extruders, manufactured by companies such as Cincinnati Milacron or Werner-Pfleiderer, and the like, or kneaders, manufactured by companies such as Buss and the like, are very commonly used devices to convert polymers and other ingredients into either pellets or compounded powders, or, in some instances, directly into films and molded articles. Those skilled in the art can design the screws and pressure seals used in extruders or kneaders to provide exactly the desired processing temperatures, shear history and mixing required by the product specifications. In this "entry point", the polymeric matrix—either by itself or partially or completed formulated—can be added at one end of the extruder or kneader and partially melted, due to the high temperatures and shearing. At an appropriate location, the aqueous additive in either emulsion or wet cake form can be "pumped" into the second "zone" and intimately mixed with the partially or completely melted polymer matrix. We have found that low-shear diaphragm pumps, such as those manufactured by Hydroflo (Plumsteadville, Pa.), Milton Roy or American Lewa, can be used for efficient pumping. Alternatively, progressive cavity pumps, such as those manufactured by Moyno Inc. and the like, also are well-suited to the purpose of pumping in emulsions into kneaders and extruders. Once the additive in aqueous form has been mixed with the polymer matrix in melt or powder form, the moisture can be removed in a third extrusion "zone", preferably under reduced pressure. We have discovered that high levels of moisture can be efficiently removed in this manner, and that impact performance is equivalent to that of PVC combined with additives added in powder form in blenders.

The matrix-additive mixture compounded using such devices can then be reshaped into pellets or formed into sheets or molded articles. Alternatively, the compounded pellets or powders can be re-processed in additional processing steps (e.g. a second extruder) to form very useful sheets, films or molded plastic articles, used in end-use applications.

These three "entry points"—blenders, dryers and extruders/kneaders—can also be used together in various combinations. For example, certain formulation ingredients could be added to large blenders to make a large masterbatch, in which one or more ingredients are missing. Then, one or more aqueous-based additives can be added either in a small "cup" to this masterbatch mixture of powders, to another, smaller high-speed blender, or to a kneader or extruder. Alternatively, one or more additives, each in aqueous form—for example, an acrylic impact modifier, a processing aid, an emulsified thermal stabilizer "package" and a biocide as a preservative—could all be combined in an aqueous emulsion and then added as an emulsion mixture to, for example, a blender or an extruder.

In many of these mixing and compounding extrusions, we have found properties to be either fully equivalent or in some case superior to those mixtures which were compounded using more conventional, powder-based procedures.

Even if an additive is not ordinarily manufactured in emulsion form, it could be "artificially emulsified" by dissolving it in a suitable solvent, adding emulsifier and water, and then removing the solvent, as taught for example, in U.S. Pat. No. 3,642,676. Once in emulsion form, the additive could be added in any of the "entry points" described above.

Finally, adding the additive in aqueous form provides new opportunities for novel polymer designs for new additives. Without the need for isolation to powders, formulators and polymer designers have much greater flexibility. They can design and synthesize new types of polymeric additives to get improved impact, improved processability, lower cost, etc. without the burdensome requirement for isolating the additive as a powder. Isolating some of these additives to powder would be impractical or impossible: either the powders formed from such polymers would be sufficiently dusty to be a health or environmental hazard; or, alternatively, some would be so "sticky" that they would compact to form bricks, requiring harsh manual labor just to break the lumps apart to do further processing.

As illustrated in the Examples, the present invention enables the design of lubricating PAs with better lubrication and processability at reduced loadings in PVC over conventional designs. Additionally, the present invention allows for the design of novel, high-alkyl acrylate-content AIMs to provide significantly higher notched Izod impact. Finally, MBS modifiers could be designed without the need for special thermal stabilizer packages required for their isolation to powders.

Using the present invention, a poly(vinyl chloride) ("PVC") formulation might be blended by the following procedure: (a) 100 parts of PVC powdered resin is added to a Henschel high-speed mixer (operating at a speed of about 1000 rpm) at 23° C.; (b) 2-30 parts of an aqueous emulsion of acrylic impact modifier is added at 25° C.; (c) 0.9 parts of a thermal stabilizer (e.g. "ADVASTAB" TM-281SP, available from Morton Specialty Chemicals) is added at 52° C.; (d) 1.3 parts calcium stearate stabilizer (e.g. calcium stearate from Witco or "CEASIT" I from Barlocher Inc.) is added at 66° C.; (e) 0.5 parts polyethylene wax lubricant such as "HOSTALUB" XL 165 (available from Clariant) and/or 0.5 parts of AC629A (an oxidized LDPE wax available from Allied-Signal) is added at 66° C.; (f) 1-2 parts of an aqueous emulsion of an acrylic processing aid, and 1-2 parts of an aqueous emulsion of an acrylic lubricating processing aid are added at 77° C.; (g) 1.0 parts $TiO_2$ opacifier, UV screen (such as "ZOPAQUE" RCL4 available from SCM Chemicals—Americas) is added at 82° C.; and (h) 10.0 parts filler such as $CaCO_3$ is added at 88° C. After all of the ingredients have been added to the mixer, the friction continues to heat the mix to 100° C. whereupon the water (which is only approximately 1-18 parts, based on 100 parts PVC) evaporates. The water vapor is removed using an appropriate venting or vacuum device and/or filter (which allows the water to escape as it vaporizes but keeps the remaining ingredients from leaving the mixer). After the evaporation reduces the moisture level below 0.004 parts water, friction continues to heat the blend to about 105° C. whereupon the mix is conveyed to a cooler vessel. Further processing then takes place to form specific end-use plastic parts.

The above example formulation is just one example. Those skilled in the art know that many other and similar ingredients and blending procedures are used in PVC formulations, often in levels that differ from that above. Other typical PVC formulations can be found in reference books such as *Impact Modifiers for PVC: the History and Practice*, by John T. Lutz, Jr. and David L. Dunkelberger (New York: Wiley, 1992). Exact formulations depend on the end-use of the matrix application.

Syntheses of the additive compositions of the present invention are generally well known in the art and are typically accomplished through emulsion polymerization. Any of a variety of emulsifiers well known for emulsion polymerization of acrylates and methacrylates can be used. Useful emulsifiers include common soaps, salts of alkyl, aryl, aralkyl, or alkaryl sulfates or sulfonates, alkylpoly (alkoxyalkyl) ethers, alkylpoly (alkoxyalkyl) sulfates or alkyl salts of long-chain fatty acids, alkylbenzenesulfonates, $C_8$ to $C_{18}$ alkylphenoxy-polyethylene sulfonates, diphenyl ether disulfonates, sodium lauryl sulfate, salts of long-chain amines, salts of long-chain carboxylic and sulfonic acids, and the like.

The polymerization medium preferably contains an effective amount of a free-radical initiator, those conventionally utilized in free-radical polymerizations conducted in the temperature ranges from about room temperature to about 100° C. These include thermally-activated initiators such as persulfates, peroxides or peroxyesters. They also include "redox" initiators, comprised of at least one oxidant and one reductant. Examples of oxidants include hydroperoxides (e.g. cumene hydroperoxide, diisopropylbenzene hydroperoxide or t-butyl hydroperoxide), persulfates (e.g. sodium persulfate), peroxides (e.g. hydrogen peroxide) and the like. Examples of reductants include sodium formaldehyde sulfoxylate, sodium sulfite, sodium hydrosulfite, sodium metabisulfite, isoascorbic acid, hydrazine, hydroxylamine, and the like. Such "redox" reactions may be promoted by such reagents as metal salts (e.g. ferrous sulfate heptahydrate, ferric monosodium ethylenediamine tetraacetate dihydrate and the like).

Additionally, pH buffers may also be used to adjust pH as required for the emulsion polymerization synthesis. Acids used to adjust pH may be any of a number of organic or inorganic acids, preferably water-soluble, such as hydrochloric, sulfuric, phosphoric, acetic, methanesulfonic or tartaric. Bases such as sodium carbonate, sodium bicarbonate and sodium hydroxide may also be used to increase the pH as required.

Chain regulating agents, such as n-dodecyl mercaptan, t-dodecyl mercaptan, methyl mercaptopropionate and mercaptopropionic acid and the like, commonly used in emulsion polymerization to adjust molecular weight, are preferably employed in the synthesis of the aqueous additive systems of the present invention.

Polymerization adjuvants may also be added during or subsequent to the polymerization reaction of the polymeric additive. These may include one or more of the following: defoamers, such as "SURFONYL" 104E (available from Air Products & Chemicals, Inc.); leveling agents, such as "SAG" Silicone Antifoam 47 (available from Union Carbide Corp.); antioxidants for inhibiting or controlling polymerization, such as "MAROXOL" 20 (available from Martin Marietta Corp.) and "IRGANOX" 1010 (distributed by Ciba-Geigy); plasticizers, such as "FLEXOL" (distributed by Union Carbide); emulsion stabilizers and protective colloids, such as polyacrylic acid polymers, hydroxyethyl cellulose, methyl cellulose, and polyvinyl alcohol. Finally, aqueous additive systems of the present invention can also optionally contain biocides and the like to allow for prolonged storage of the additive system. Such preservatives, such as "KATHON" LX (distributed by Rohm and Haas) and "PROXEL" CRL (distributed by ICI Americas) are commonly used at levels of about 5 to about 250 parts per million by weight of monomer mixture to prevent/control bacterial growth in aqueous systems upon storage.

In addition to providing aqueous additive systems that correspond to powder-form additives currently available, the present invention further provides for new additive compositions that contain significantly higher rubber content than powder-form compositions currently available. Such compositions allow for increased impact/processability performance when compared to compositions available only in isolated form. This type of improved composition is obtainable because of there is no need to modify the additive compositions to allow for isolation (e.g., the use of high Tg or "hard" shells surrounding the functional composition).

Finally, the aqueous additive systems of the present invention can optionally include other ingredients commonly used in matrix resin blends. These include plasticizers (e.g. dioctyl phthalates and the like), UV stabilizers, lubricants, waxes, pigments, toners, rheology modifiers, flame retardants, thermal stabilizers, antiozodants, fillers, mold release agents, and hollow spheres. These may be added in emulsion, liquid or powder form.

AIM impact-modifier additive compositions are well known in the art and are described in patents such as U.S. Pat. No. 5,612,413, the text of which is incorporated herein by reference. Such additive compositions are commonly synthesized by emulsion polymerization. While such additives can take the form of alkyl acrylate—alkyl(meth)acrylate copolymers, as described in prior art such as U.S. Pat. No. 3,251,904 (the text of which is incorporated herein by reference), the compositions preferably take the form of multi-stage copolymers containing from 50 to 99 weight percent of a "rubbery" core (imparting impact performance functionality) and a "hard" shell having a high Tg to aid in the required isolation by spray drying or coagulation. The rubbery core of the AIM compositions comprise, as polymerized units, monomers such as ethyl acrylate, butyl acrylate and/or higher (up to C12) alkyl acrylates. The rubbery core of these compositions may optionally contain units derived from a monomer containing at least two non-conjugated copolymerizable double bonds, such as 1,3-butylene glycol diacrylate, 1,4-butylene glycol diacrylate, trimethylolpropane triacrylate, allyl acrylate, allyl methacrylate, divinylbenzene, 1,3-butylene glycol dimethacrylate, diallyl maleate, and the like. Additionally, the rubbery core of these compositions may also contain other monomers copolymerized with the alkyl acrylates such as (meth) acrylates, acrylonitrile, methacrylonitrile, vinyl esters such as vinyl acetate, acrylic acid, (meth)acrylic acid, acrylamide, (meth)acrylamide, N-methylol acrylamide, chloro-ethyl acrylate, alkylthioalkyl acrylates, alkoxyalkyl acrylates, conjugated diolefins, such as isoprene, 1,3-butadiene; vinyl aromatic monomers and the like.

The hard shell of the AIM compositions is usually comprised of at least 50 weight % of a $C_1$-$C_4$ methacrylate, preferably methyl methacrylate, and is grafted onto the rubber stage. The shell of the AIM compositions may optionally contain other copolymerizable monomers such as alkyl acrylates, styrene, substituted styrenes, acrylonitrile, methacrylonitrile, vinyl esters such as vinyl acetate, vinyl ethers, vinyl amides, vinyl ketones, olefins and the like. Additionally, the shell of the AIM compositions may also contain monomers with reactive functionality in the shell. These include, for example, methacrylic acid, acrylic acid, itaconic acid, glycidyl methacrylate, acrylonitrile, methacrylonitrile, divinyl benzene, hydroxyethyl acrylate, hydroxyethyl methacrylate, and the like.

The rubbery core may be polymerized in the presence of preformed polymer dispersion ("seed" latex), for control of desired particle size. The "seed" latex is often of small particle size, such as below 100 nm, and of a composition similar to that of the rubbery core.

The described AIM additive compositions are useful for imparting impact performance to matrix resins such as PVC for use in outdoor applications where it is exposed to natural elements. Examples of such uses include impact-modified PVC used for pipe, gutters, siding, fencing, window profiles and the like. The described AIM additive compositions are also described as being useful as impact modifiers for engineering resins, such as aromatic polyesters, polycarbonate, styrene-acrylonitrile copolymers, methyl methacrylate copolymers, polyamides, epoxy resins, polyacetals, epoxy resins, and phenol-formaldehyde thermosets and the like. The AIM additive compositions are useful when blended with polymer matrices at loading levels between 0.1 and 30 weight percent.

AIM compositions useful as additives in aqueous form according to the present invention are provided in Example 1 below. As shown in the Examples, the aqueous AIM additive systems of the present invention impart acceptable impact performance characteristics when blended with a matrix resin. Moreover, the aqueous additive systems of the present invention allow for high-rubber content compositions, which are not available in isolated (i.e., powdered) form. These high-rubber compositions allow for increased performance over previously available AIM compositions. While art such as U.S. Pat. No. 5,612,413 describes compositions that contain up to 95% of a rubbery core, in practice compositions that contain rubbery cores exceeding about 70% are not readily isolated in commercial-scale operations without manufacturing difficulties. Such compositions can be isolated by adding a large percentage of mineral or polymeric based "flow-aids", but these often detract from performance properties. As a result, high rubber-containing core-shell polymers are therefore not used or available in industry.

Butadiene-based additive compositions are well-known in the art and are described in patents such as U.S. Pat. No. 5,534,594, the text of which is incorporated herein by reference. Such additives are known to provide desirable impact properties to matrix resins such as styrene-acrylonitrile copolymers, methyl methacrylate copolymers, PVC, polycarbonate, polyesters, polyacetals, polyamides, epoxy resins, phenol-formaldehyde thermosets and the like. These additives are typically synthesized by emulsion polymerization and comprise a rubbery phase based upon homopolymers of butadiene or copolymers of butadiene and styrene. Preferred versions of the compositions contain at least one additional stage or shell based on homopolymers or copolymers of poly(methyl methacrylate) and/or styrene and the like grafted to the rubbery stage, and thus are known as "MBS" (methyl methacrylylate-butadiene-styrene) core-shell polymers. Somewhat similar copolymers of acrylonitrile and butadiene are often known as NBR impact modifiers, while somewhat similar terpolymers comprised of acrylonitrile, butadiene and styrene are known as ABS impact modifiers. Unless indicated otherwise, the use of the term "MBS" is intended to encompass NBR and ABS compositions also.

The rubbery core of MBS compositions may be a homopolymer of butadiene or a copolymer of butadiene with other comonomers. Often, monomers are commonly added with at least two reactive carbon-carbon double bonds, that is, bonds which are sufficiently activated or sterically available so that they will copolymerize with the butadiene or any monovinyl or monovinylidene monomers that might be present. Examples of such monomers are divinylbenzene, butylene glycol dimethacrylate, trimethylolpropane triacrylate, allyl methacrylate, and diallyl maleate. The butadiene core may also contain other monomers copolymerizable with the butadiene such as: other conjugated diolefins, such as isoprene; alkyl acrylates or methacrylates, such as butyl acrylate, methyl methacrylate, or ethyl acrylate; vinyl aromatic monomers, such as styrene, alpha-methyl styrene, and chlorostyrene; acrylonitrile; methacrylonitrile; and the like. These monomers may also be present in any of the other stages of the MBS composition.

The rubbery core may be polymerized in the presence of preformed polymer dispersion ("seed" latex), for control of desired particle size. The "seed" latex is often of small particle size, such as below 100 nm, and of a composition similar to that of the rubbery core. MBS modifiers, like AIMs, commonly use the sort of emulsifiers, free-radical initiators, oxidants, reductants, promoters, chain-regulating agents, pH buffers and adjuvants already described above.

Certain MBS additive compositions are known to provide impact performance while maintaining desirable optical properties of the matrix resin in which they are blended. Examples of such compositions are provided in UK patent 1,230,185, and U.S. Pat. No. 5,321,056 the texts of which are incorporated herein by reference. For such applications, the monomer composition of the core stage of the modifier is adjusted, preferably with styrene, to provide a refractive index (RI) to match that of the resin with which they are blended. The process of adjusting the RI of such compositions is well known and is described in references such as U.K. 1,159,689, the text of which is incorporated herein by reference.

MBS compositions useful as additives in aqueous form according to the present invention are exemplified by compositions provided in Examples 3 and 6 below. As shown in the Examples, the aqueous butadiene-based additive systems of the present invention impart excellent impact performance. Additionally, additive systems within the scope of the current invention impart excellent optical characteristics when blended with a matrix resin.

Processing Aid ("PA") additive compositions are described in patents such as U.S. Pat. No. 3,833,686 and U.S. Pat. No. 3,859,389, the texts of which are incorporated herein by reference. Such additives aid in the conversion of the matrix resin particles, under conditions of heat and shear, to a molten plastic capable of being shaped into the final desired object. The PA additives speed up fusion, impart high melt strength, or provide needed lubrication during the processing of the melt. Further, special lubricating PA compositions are known to aid in fluxing and release from hot metal surfaces, further contributing relatively small increases to the melt viscosity of the matrix resin blend, which is important for certain processing operations, such as injection molding.

PA additive compositions vary considerably, depending upon their required function in processing. Some currently available compositions (typically so-called lubricating processing aids) take the form of multi-stage polymers that contain a relatively "soft" core (e.g. having a Tg of 60° C. or less) and an outer relatively "hard" shell (e.g. having a Tg of 25° C. or more when polymerized in the absence of the first stage). Other processing aids are single stage polymers or copolymers comprised largely of methyl methacrylate or alternatively, styrene and acrylonitrile. Other processing aids have "hard cores" and "soft outer stages". Still others exhibit more complex compositions or morphologies, alternating hard and soft stages as needed to improve processing and facilitate ease of isolation to powders. The soft core of the PA compositions are often copolymers preferably derived from $C_1$ to $C_{18}$ alkyl acrylate monomers as one component and optionally contain units derived from at least one different copolymerizable monomer, usually $C_1$ to $C_{18}$ alkyl methacrylate monomers. Alkyl acrylates suitable for use in the soft cores of PA compositions include butyl acrylate, ethyl acrylate and 2-ethylhexyl acrylate. Ethyl acrylate and butyl acrylate are preferred. Styrene or another comonomer may be used to adjust the refractive index for processing aids in clear-grade formulations (see discussion above on MBS modifiers). Optional copolymerizable monomers suitable for use in the soft cores of PA compositions include $C_1$ to $C_{18}$ alkyl (meth)acrylates, acrylonitrile, (meth)acrylonitrile, acrylic acid, (meth)acrylic acid, substituted styrenes, and vinyl esters such as vinyl acetate.

Monomers useful in forming the outer shell of PA compositions include methyl (meth)acrylate, other alkyl methacrylates like butyl methacrylate, alkyl acrylates, stryene, acrylonitrile, and vinyl esters such as vinyl acetate, vinyl ethers, vinyl amides, vinyl ketones, olefins, and the like.

While the soft stage(s) and the hard stage(s) of PA compositions are preferably uncrosslinked, any stage or stages may optionally contain relatively small amounts of polyfunctional crosslinking monomers such as alkylene glycol diacrylates, alkylene glycol di(meth)acrylates, divinyl benzene, divinyl adipate, and/or diallyl maleate phthalate and the like. Additionally, chain transfer agents such as n-dodecyl mercaptan and t-dodecyl mercaptan and the like are commonly used to modify the molecular weight of the processing aid as required by the application.

The final hard stage for processing aids performs a dual function: it aids in ease of isolation of these polymers, and the alkyl methacrylate copolymer preferably used in this final hard stage also is known to provide some compatibility with polymers such as polyvinyl chloride. Since the hard shell for certain processing aids, like lubricating processing aids, is used in part to provide for isolation capabilities, PA additive compositions under the present invention do not necessarily require the presence of a hard outer shell for isolation purposes. Indeed, compositions that do not contain such a shell can impart greater processability to the matrix resin than compositions that contain the shell.

Processing aid additives, like the AIM and MBS modifiers, commonly use the sort of emulsifiers, free-radical initiators, oxidants, reductants, promoters, chain-regulating agents, pH buffers and adjuvants already described above.

PA compositions useful under the present invention are set forth in Examples 4, 5 and 7. As shown in the Examples, these compositions impart processability to matrix resins. Additionally, the present invention allows for the design of PA compositions wherein the hard shell is omitted. Such compositions are capable of imparting equivalent processability at significantly lower loading levels.

EXAMPLES

The following non-limiting examples illustrate only a few embodiments of the invention and compare some of its characteristics with those of the prior art. In all of the polymer synthesis procedures described in this patent, the ingredients are given based upon 100 parts of the added monomers. Abbreviations used in the examples are defined as follows:

BA=butyl acrylate

EA=ethyl acrylate

BD=1,3 butadiene

MMA=methyl (meth)acrylate n-DDM=n-dodecyl mercaptan t-DDM=t-dodecyl mercaptan

SLS=sodium lauryl sulfate

SFS=sodium formaldehyde sulfoxylate

Sty=Styrene

DVB=divinyl benzene

CHP=cumene hydroperoxide

NaPS=sodium persulfate t-BHP=t-butyl hydroperoxide

As used throughout herein, additive compositions have been described using monomer abbreviations separated by single-slashes and/or double-slashes. In such descriptions, monomers that are separated by single-slashes are co-polymerized. The use of double-slashes designates the interface of different stages of a multi-staged polymer. Thus, the description 75 BD//14.2 Sty/2.5 MMA//8.3 MMA indicates a three-staged polymer containing a 75 weight percent of a core composed of butadiene, 16.7 weight percent of a second stage composed of a styrene-MMA copolymer, and 8.3 percent of a shell composed of MMA.

Example 1

A series of acrylic additives ranging in composition from 80 BA//20 MMA to 100 BA//0 MMA, designated "a" through "h", were prepared in emulsion by the following procedure. In preparing the different polymers of this example the same generic procedure was followed but the number of parts of certain ingredients changed. Table I below summarizes the changes that were made for the various runs. The generic procedure used was as follows:

To an appropriate stirred reactor fitted with means for nitrogen addition, a reflux condenser, and means for adding monomers and other ingredients, was charged a parts of deionized water and 0.021 parts of glacial acetic acid and heated to 45° C. while sparging with nitrogen. The nitrogen was then adjusted to sweep the atmosphere over the reaction mixture. 0.100 parts SFS in 2.33 parts of deionized water was prepared and added to the reactor. 12.6×b parts of an acrylic seed emulsion was added to the reactor. The parameter b is a multiplication factor used to adjust the BA monomer level added in stage I as well as other ingredients that are to be maintained proportional to the BA monomer level. 10% of an emulsified monomer mix ("EMM") (containing 1.43×b parts of a 28% aqueous mix of SLS, 21.8×b parts of deionized water, 78.2×b parts BA, and 0.867×b parts trimethylolpropane triacrylate), rinsed in with 0.699×b parts of deionized water. 0.110 parts of CHP was then prepared. 11% of this CHP charge was then added. The added initiator caused the reaction mixture to exotherm. In a similar manner, two additional EMM and CHP charges were added: the second comprised of 20% of the EMM and 18% of the CHP charges described above, the third comprised of 40% of the EMM and 39% of the CHP. For the fourth and final EMM addition, the remaining 30% of the EMM was modified, by adding 0.023 parts of allyl methacrylate before the EMM was added to the reactor. This was rinsed in with 2.69 parts of deionized water. The remaining 32% of the CHP was then added.

After exothermic, the emulsion was cooled to 55° C. in preparation for the second stage. After cooling, c parts of SFS dissolved in 1.13 parts of deionized water, d parts of MMA, and e parts of n-DDM were added. These were rinsed in with a total of 2.31 parts of deionized water. Then c parts of NaPS dissolved in 1.13 parts of deionized water was added. The reactor was cooled to 35° C. The polymeric emulsion was then filtered.

Table I provides the changes made to the above procedure to prepare the variants designated "a" through "h". This Table provides the following factors used to vary the generic procedure: (1) the number of parts of the initial deionized water, a; (2) the BA "multiplication factor" b; (3) the stage II NaPS; and SFS parts, c; (4) the MMA monomer parts, d; and (5) the n-DDM parts, e.

Where possible, the variants were isolated from the emulsion by spray-drying at 140° C. inlet and 60° C. outlet temperatures. Examples 1a and 1b were isolated in this way to form powder Examples 1ap and 1bp. However, spray-drying emulsion 1c and 1d was extremely problematic due to the greatly reduced amount of hard shell. In attempting to isolate emulsions 1c and 1d, the spray-dryer was significantly fouled with a sticky, rubbery substance, requiring a laborious clean-up procedure. Moreover, the powder particles isolated from Emulsions 1c and 1d were large and irregularly shaped and provided erratic results when blended with matrix resin. Therefore, no attempt was made to isolate the higher rubber variant Examples 1e-1 h as powders.

Example 2

An 88 BA//12 MMA multi-stage polymer was prepared in emulsion by following the procedure disclosed in Example 12 of U.S. Pat. No. 5,612,413 (the text of which is incorporated herein by reference) with the following modifications:

Ingredients: The amount of SLS used in the first shot was 1.3% (based on total monomer added); subsequent shots used 0.89% SLS.

Sampling: A sample of the emulsion at the end of the rubber stage was taken and designated as Example 2a. A sample of emulsion at the end of the emulsion process was taken and designated as Example 2b.

Isolation: The remainder of the emulsion was isolated using the procedure described in EP 536935, Example 1, section A, subsection 4. A small sample of slurry was taken after the coagulation step and the water removed by vacuum filtration. This sample was designated as wet cake, Example 2c.

Finally, the remaining wet coagulum washed and dried according to EP 536935 to form a free-flowing powder. This final powder was designated as Example 2d.

Example 3

A 75 BD//14.2 Sty/2.5 MMA//8.3 MMA multi-stage polymer was prepared in emulsion by following the procedure disclosed in Example 7 of U.S. Pat. No. 5,534,594 (the text of which is incorporated herein by reference) with the following modifications:

The initial charge to the reactor consisted of 73.1 parts deionized water, 0.075 parts of sodium hydroxide, 9.13 parts of the pre-formed polymer latex, 0.067 parts of tetrasodium pyrophosphate, 0.12 parts of ferric monosodium ethylene-

TABLE 1

BA//MMA Synthesis Variants

| Example | Monomer Composition | a (Initial H2O, number of parts) | b (BA Multiplication factor used to calculate parts of stage I ingredients) | c (NaPS and SFS parts) | d (MMA parts) | e (n-DDM parts) |
|---|---|---|---|---|---|---|
| 1a | 80 BA// 20 MMA | 49.3 | 1.00 | 0.023 | 20.9 | 0.001 |
| 1b | 80 BA// 20 MMA | 49.3 | 1.00 | 0.023 | 20.9 | 0.1 |
| 1c | 85 BA// 15 MMA | 50.1 | 1.08 | 0.017 | 15.0 | 0.0614 |
| 1d | 90 BA// 10 MMA | 48.4 | 1.14 | 0.0054 | 9.99 | 0.0409 |
| 1e | 92 BA// 8 MMA | 47.5 | 1.18 | 0.0088 | 8.00 | 0.0329 |
| 1f | 95 BA// 5 MMA | 46.1 | 1.20 | 0.0055 | 5.00 | 0.0002 |
| 1g | 95 BA// 5 MMA | 46.1 | 1.20 | 0.005 | 5.00 | 0.0204 |
| 1h | 100 BA// 0 MMA | 62.4 | 1.27 | Not applic. | 0 | Not applic. | diaminetetraacetate dihydrate, and 0.202 parts SFS. The temperature of the initial charge was 85° C.

Feeds I, II and III were fed over an eight hour period. Feed I consisted of 7.73 parts deionized water and 1.519 parts potassium oleate. Feed II consisted of 75 parts BD, and Feed III consisted of 0.301 parts of 70% aqueous t-BHP. The reaction temperature was maintained at 90° C. during the eight hour feed. Thirty minutes after completion of the feeds, 0.075 parts SFS dissolved in 1.29 parts deionized water was added to the reactor.

Then, 0.113 parts of 70% aqueous t-BHP was added over a three hour period. After completion of the t-BHP feed, the reaction mixture was cooled to 66° C. The pressure was relieved by venting, then 0.038 parts NaOH dissolved in 0.263 parts deionized water was added to the reactor, which was then cooled to 60° C.

Feeds IV, V and VI were added over a 5 hour period as Stage II. Feed IV consisted of 0.84 parts NaOH dissolved in 1.441 parts deionized water. Feed V consisted of 0.126 parts 70% aqueous t-BHP and 1.66 parts deionized water.

After Stage II additions were completed, a mixture of 0.033 parts SFS dissolved in 0.571 parts deionized water was added to the reactor. Stage III consisted of mix of 8.30 parts of MMA, 0.031 parts DVB, and 0.217 parts deionized water. This mix was added over a 30 minute period. At the same starting time, a cofeed of 0.050 parts 70% aqueous t-BHP was added over a three hour period. Upon exotherming, the reaction mixture was held at 65° C. for the entire three hour t-BHP feed.

At the end of all feeds, the emulsion was stabilized according to the procedure described in Example 3 of U.S. Pat. No. 5,534,594. A sample of the stabilized emulsion was retained as Example 3a. The remainder of the emulsion was isolated by coagulation using method B described in U.S. Pat. No. 5,534,594. The powder sample so formed was designated Example 3b.

Example 4

A 34.1 Sty/23.5 BA/2.4 MMA//39 MMA/1 Sty multi-stage polymer was prepared in emulsion by following the procedure disclosed in Example I, composition B of U.S. Pat. No. 3,859,389 (the text of which is incorporated herein by reference) with the following modifications:

The initial charge to the reactor consisted of 51.3 parts deionized water, 0.021 part acetic acid, and 0.156 parts SLS (28% solids in an aqueous mixture).

The stage I monomer mixture consisted of 23.7 parts of deionized water, 0.0047 parts of sodium carbonate, 2.87 parts 28% aqueous SLS surfactant, 2.50 parts of methyl methacrylate, 24.6 parts of butyl acrylate, 35.8 parts of styrene and 1.09 parts of tert-dodecyl mercaptan. 10.8% of this stage I monomer mixture was added to the reactor. Then, 0.123 parts of SFS, 0.0256 parts of 70% aqueous t-BHP, and 3.68 parts of deionized water was added to the reactor. The reaction mixture exothermed to 74° C. Then the following ingredients were added to the reactor over the next 3.5 hours: the remaining stage I monomer mixture, 0.0993 parts of SFS, 0.406 parts of 70% aqueous t-BHP, and 6.86 parts of deionized water. The temperature was maintained at 74° C. After the reactor additions were completed, the reaction mixture was cooled to 57° C. 13.9 parts of this mixture was removed from the reactor. This was retained for testing as a sample of the stage I emulsion, and designated Example 4a.

At this point, 0.0294 parts of 70% aqueous t-BHP, 0.0452 parts of SFS and 2.26 parts of deionized water were added to the reactor. Then, simultaneously, over a period of ninety minutes, 36.1 parts of MMA, 0.921 parts of styrene, 0.0107 parts of t-DDM, 0.0405 parts of 70% aqueous t-BHP and 0.62 parts of deionized water) were added to the reactor. The reaction mixture was maintained at 71° C.

After these additions were made, 1.81 parts of deionized water were added to rinse in the ingredients. The reaction mixture was cooled to 55° C. 0.0601 parts of sodium carbonate and 3.36 parts of deionized water were added to the reactor. Cooling continued until the reaction mixture was less than 40° C. At this point the emulsion was filtered and then flushed with 1.77 parts of deionized water. The final emulsion sample was designated Example 4b.

The polymer listed in the above was isolated from the emulsion by spray-drying. The particle sample so isolated was designated as Example 4c. Example 4d was obtained by freeze-drying emulsion Example 4b.

Example 5

A 15 MMA/10 EA//75 MMA multi-stage polymer was prepared in emulsion by following the procedure disclosed in Example 1, composition C of U.S. Pat. No. 3,833,686 (the text of which is incorporated herein by reference) with the following modifications:

The initial charge to the reactor consisted of 43.1 parts of deionized water, 0.437 parts of sodium carbonate and 0.0437 parts of NaPS. The temperature was adjusted to 79° C.

A monomer mix was prepared consisting of 16.2 parts of deionized water, 0.0437 parts of sodium carbonate, 1.36 parts of a 28% solids mix of SLS, 15 parts of MMA, 10.1 parts EA, and 0.055 parts of n-DDM. A initiator mix consisting of 0.0175 parts of NaPS dissolved in 4.37 parts of deionized water was fed to the reactor simultaneously with the monomer mix over a period of one hour. The reactor exothermed to 87° C., where it was maintained. After the feed was completed, the feed mixtures were rinsed in with an additional 2.45 parts of deionized water. The reaction mixture was cooled to 79° C.

A second monomer mix consisting of 75 parts of MMA, 0.0066 parts of n-DDM, and 1.31 parts of deionized water was prepared. This mixture was divided into six equal parts; each part was added to the reactor as a shot. Each shot of this second monomer mixture was followed by the addition of 0.00481 parts of NaPS and 0.44 parts of deionized water. After the third initiator shot, 2.0 parts of 28% solids SLS was added. An additional 4.81 parts of deionized water was used for rinsing and dilutions during and after the additions.

After the sixth shot 0.0035 parts of ferrous sulfate heptahydrate, 0.00875 parts of the disodium salt of ethylenediamine tetraacetic acid dihydrate, 0.018 parts of SFS, 0.03 parts of 70% aqueous t-BHP, and 1.09 parts of deionized water were added. The reaction mixture was cooled to 45° C. and flushed with 5.5 parts of deionized water.

Example 6

A 57 BD/17 Sty/1.2 DVB//14.2 Sty/2.5 MMA//8.3 MMA multi-stage polymer was prepared in emulsion by following the procedure disclosed in Examples 3a-3b above with the following modifications:

The initial charge to the reactor consisted of 0.121 parts tetrasodium pyrophosphate, 0.0034 parts ferric monosodium ethylenediaminetetraacetate dihydrate, and 0.203 parts SFS, 0.72 parts potassium oleate, and 152 parts of deionized water.

57 parts BD, 17 parts Sty, 1.2 parts DVB, 0.3 parts deionized water and 0.71 parts potassium oleate and 0.237 parts of 70% aqueous t-BHP were added over a 4.25 hour period. The reaction temperature was maintained at 85° C. during these additions.

After these additions were made, the reactor was cooled to 66° C. over 2.5 hours, during which time 0.094 parts SFS, 0.112 parts of t-BHP (70% aqueous), and 3.2 parts deionized water were added to the reactor. The reactor was vented to reduce the pressure to atmospheric. A small portion of emulsion was removed from the reactor and designated as Example 6a.

While cooling the reaction mixture, two solutions were prepared. An aqueous surfactant solution consisting of 0.206 parts of a commercially available surfactant, Dowfax™ 2A1, a 45% aqueous mix of diphenyl ether disulfonate, and 1.73 parts of deionized water. This surfactant solution was added. A second solution was prepared using 0.360 parts of glacial acetic acid mixed with 14.0 parts of deionized water. This solution was added after the surfactant solution. Then, 0.37 parts of potassium oleate, 1.45 parts of 20% aqueous sodium hydroxide and 11 parts of deionized water were added to the reactor over a twenty minute period.

Then, 0.113 parts of 70% aqueous t-BHP was added over a three hour period. After completion of the t-BHP feed, the reaction mixture was cooled to 66° C. Then, 0.038 parts NaOH dissolved in 0.263 parts deionized water was added to the kettle, which was then cooled to 60° C.

Stage II and Stage III are identical to that described in Examples 3a-3b, except that Feed IV consisted of 0.084 parts SFS (not NaOH) dissolved in 1.441 parts deionized water.

The final emulsion sample was designated Example 6b. The final, coagulated, dried powder was designated Example 6c.

Example 7

To an appropriate stirred reactor fitted with means for nitrogen addition, a reflux condenser, and means for adding monomers and other ingredients, was charged 82.02 parts of deionized water. 0.044 parts of acetic acid were added and rinsed in with 1.0 parts of deionized water. 0.00883 parts of ferrous sulfate heptahydrate, dissolved in 5.0 parts of deionized water, were added. Then, 0.197 parts of NaPS, dissolved in 5.03 parts of deionized water, were added to the reactor. The reactor was sparged with Nitrogen gas for twenty minutes. The temperature was adjusted to 25° C. An Emulsified monomer mix ("EMM"), consisting of 89.99 parts of deionized water, 3.65 parts of a 28% solids aqueous mix of SLS, 91.17 parts of MMA, 3.0 parts of EA, 4.36 parts of Sty, 1.51 parts of butyl methacrylate and 0.007 parts of t-DDM, was prepared.

After the twenty minute nitrogen sparge was completed, the EMM was added as a shot to the reactor over one minute. A nitrogen sweep was started and maintained for the remainder of the reaction process. A solution of 0.193 sodium hydrosulfite in 9.71 parts of deionized water was prepared and added. The temperature rose within one minute from room temperature, increasing over the next eleven minutes, before peaking at 81.2° C. The reaction mixture was held at 80° C. for one hour to complete the reaction. The particle size (measured by the BI-90™ from Brookhaven Instruments) was 56 nm. The weight average molecular weight by GPC was 0.923 million. A sample of the emulsion was retained as Example 7a.

The emulsion was isolated by spray drying and retained as Example 7b.

Example 8

The additive compositions of Examples 1a and 3 were blended with PVC in a standard PVC siding substrate formulation, which is provided below in Table 2.

TABLE 2

PVC Siding Substrate Formulation

| Component | Product Used/Source | Level (phr) |
|---|---|---|
| PVC resin | "GEON" 27 (K = 66)/Geon | 100.0 |
| Tin Stabilizer | "ADVASTAB" TM-181/Morton Specialty Chemical Products | 0.9 |
| Lubricant (Calcium Stearate) | Calcium Stearate (Regular)/Witco Corp. | 1.3 |
| Paraffin Wax | "HOSTALUB" XL-165/Clariant | 1.0 |
| Oxidized LDPE Wax | AC629A/Allied-Signal | 0.1 |
| Acrylic Processing Aid | "PARALOID" K-120ND/Rohm and Haas | 0.5 |
| Acrylic Lubricating Processing Aid | Example 4c | 0.5 |
| Impact Modifier | — | 3.0-10.0 |
| TiO$_2$ Pigment | "ZOPAQUE" RCL4/SCM Chemicals | 1.0 |
| Filler (Calcium Carbonate) | "OMYACARB" UFT/OMYA, Inc. | 10.0 |

The components of the formulation were blended in a Henschel type FM 40 D mixer agitated at approximately 1000 rpm to heat up to 110° C. by mechanical means with no external heating provided. The PVC resin component was added to the mixer first at a temperature of about 23° C. The tin stabilizer component was added when the temperature had reached about 52° C. The calcium stearate lubricant, paraffin wax and oxidized LDPE wax components were added when the temperature had reached about 66° C. The processing aid and lubricating processing aid components were added when the temperature had reached about 77° C. The pigment component was added when the temperature had reached about 88° C. The calcium carbonate filler component was added when the temperature had reached about 90° C. When the additive composition of Example 1 was used in the siding formulation, the impact modifier component was added at about 23° C. when the emulsion-form was used, and at about 82° C. when the powder-form was used. When the additive composition of Example 3 was used, the impact modifier component was added at about 82° C., whether the composition was in emulsion-form or powder form.

The blended powders were then milled on a 6 inch×13 inch (15.2 cm×33.0 cm) two-roll Collin type WW 150 P electric mill at 180° C. for five minutes. The milled samples were removed from the mill, folded into 9 layers, and compression molded in a 6.5 inch×9.5 inch×0.092 inch (16.5 cm×42.1 cm×0.2 cm) mold while preserving machine (i.e. milling) directionality. The milled samples were compression molded into plaques by heating to 180° C. for three minutes under 10 tons of force (44,000 kg) followed by maintaining 180° C. for two minutes at 70 tons of force (308,000 kg), followed by cooling for five minutes to room temperature at 70 tons of force (308,000 kg). The plaques were then tested for Izod impact performance at various temperatures using ASTM D256. The plaques were cut into 2.5 inch×0.5 inch (6.4 cm×1.3 cm) Izod bars and notched with a sharp notching tool at a 0.010 inch (0.25 mm) notch tip radius. Results, present below in Table 3, are averages of 10 Izod bars: 5 Izod bars for two different milled/molded plaques, both of which were aligned with the machine direction of milling.

TABLE 3

| Impact Modifier | Impact Modifier Loading Level Based on 100 parts PVC (phr) | Impact Testing Temp. (° C.) | Izod (% Ductile Breaks) Performance |
|---|---|---|---|
| 1a | 5 | 15 | 80% |
| 1ap | 5 | 15 | 20% |
| 1a | 5 | 17 | 80% |
| 1ap | 5 | 17 | 90% |
| 1a | 5 | 19 | 100% |
| 1ap | 5 | 19 | 90% |
| 1a | 5 | 21 | 100% |
| 1ap | 5 | 21 | 70% |
| 1a | 5 | 23 | 100% |
| 1ap | 5 | 23 | 100% |
| 3a | 3 | 15 | 0% |
| 3b | 3 | 15 | 0% |
| 3a | 3 | 23 | 100% |
| 3b | 3 | 23 | 100% |
| 3a | 5 | 15 | 100% |
| 3b | 5 | 15 | 70% |
| 3a | 5 | 23 | 100% |
| 3b | 5 | 23 | 100% |

As illustrated in Table 3, emulsion-form AIM and MBS impact modifier compositions impart excellent impact characteristics to PVC. Contrary to conventional wisdom, the impact characteristic imparted by emulsion-form additives are equivalent to their powder-form analogues.

Example 9

The various additive compositions of Example 1 were blended with PVC using the siding substrate formulation provided in Table 2. The level of impact modifier used, based on PVC, was 5-8 phr (corrected for percent solids if added as an emulsion). The ingredients of the siding substrate formulation were blended in a Welex type TG AHK 8 mixer (Gonther Papenmeier GmbH & Co. KG) operating at approximately 2500 rpm to heat up to 105° C. by mechanical means with no external heating provided. The ingredients of the formulation were added to the blender in the sequence described in Example 8 to form a siding substrate containing 5-8 phr impact modifier.

The blended ingredients were then milled on a 6 inch×13 inch (15.2 cm×33.0 cm) two-roll Collin type WW 150P electric mill at 185° C. for four minutes. The milled samples were removed from the mill, folded into 9 layers, and compression molded in an 8.25 inch×8.25 inch×0.127 inch (21 cm×21 cm×0.3 cm) mold while preserving machine (i.e. milling) directionality. The samples were compression molded into plaques by heating to 185° C. for three minutes under 10 tons (44,000 kg) of force, followed by maintaining 185° C. for two minutes at 70 tons (308,000 kg) of force, followed by cooling for five minutes to room temperature at 70 tons (308,000 kg) of force. The samples were then tested to determine the mean Izod and percent ductile breaks at various temperatures using ASTM D256. The sample plaques were cut into standard 2.5 inches×0.5 inches (6.4 cm×1.3 cm) Izod bars and notched with a sharp notching tool at a 0.010 inch (0.25 mm) notch tip radius. Results presented in Table 4 below are averages of 10 samples (5 Izod bars measured using plaques aligned in the transverse direction of milling, and 5 Izod bars measured using plaques aligned in the machine direction of milling).

TABLE 4

| Impact Modifier | BA//MMA Level | Loading Level of Impact Modifier | Izod Test Temp. (° C.) | Mean Izod (J/m) | % Ductile Breaks |
|---|---|---|---|---|---|
| 1a | 80//20 | 5 | 23 | 519 | 30% |
| 1a | 80//20 | 8 | 23 | 1340 | 100% |
| 1a | 80//20 | 8 | 15 | 309 | 10% |
| 1ap | 80//20 | 5 | 23 | 526 | 30% |
| 1b | 80//20 | 5 | 23 | 411 | 20% |
| 1bp | 80//20 | 5 | 23 | 234 | 0% |
| 1c | 85//15 | 5 | 23 | 227 | 0% |
| 1c | 85//15 | 8 | 15 | 500 | 30% |
| 1d | 90//10 | 5 | 23 | 570 | 30% |
| 1d | 90//10 | 8 | 15 | 1028 | 70% |
| 1e | 92//8 | 8 | 15 | 947 | 80% |
| 1f | 95//5 | 5 | 23 | 763 | 50% |
| 1f | 95//5 | 8 | 15 | 722 | 50% |
| 1g | 95//5 | 5 | 23 | 673 | 40% |
| 1h | 100//0 | 5 | 23 | 532 | 30% |
| 1h | 100//0 | 8 | 15 | 371 | 20% |

As illustrated in Table 4, emulsion-form AIM impact modifier compositions impart excellent impact characteristics to PVC. Additionally, the high rubber-containing variants, not available in powder-form, are shown to impart improved impact resistance to the matrix resin.

Example 10

The procedure of Example 9 was repeated using the MBS additive compositions of Examples 3 and 6 as impact modifiers. All impact testing was conducted at 23° C. The results are presented in Table 5.

TABLE 5

| Impact Modifier | Level of Impact Modifier (phr) | Mean Izod (J/m) | % Ductile Breaks |
|---|---|---|---|
| 3a | 5 | 1073 | 90% |
| 3a | 8 | 1234 | 100% |
| 3b | 5 | 951 | 80% |
| 3b | 8 | 1244 | 100% |
| 6b | 8 | 1180 | 100% |

Example 11

The example illustrates the flexibility provided by using aqueous additive systems within the scope of the present invention. Using the standard siding substrate formulation of Table 2 with impact modifier levels from 5-10 phr, the performance of blends made according to the procedure of Example 9, was compared to the performance of blends made by a procedure where the additive and PVC resin (in either powder, or wet-cake form) were first premixed and then dried in a fluid bed dryer, followed by addition of the remaining formulation ingredients according to the procedure of Example 9. Table 6 summarizes the premixing conditions for the samples of this Example.

TABLE 6

| Sample | PVC Form | Impact Modifier/Level (phr)/Form | Processing Aid/Level (phr)/Form | Lubricating Processing Aid/Level (phr)/Form |
|---|---|---|---|---|
| A | wet-cake | — | — | — |
| B | wet-cake | Ex. 3a/5/emulsion | — | — |
| C | wet-cake | — | Ex. 5/0.5/emulsion | Ex. 4b/0.5/emulsion |
| D | wet-cake | Ex. 2d/5/powder | — | — |
| E | wet-cake | Ex. 2b/5/emulsion | — | — |
| F | wet-cake | Ex. 1a/5/emulsion | — | — |
| G | wet-cake | Ex. 1d/5/emulsion | — | — |
| H | wet-cake | Ex. 1a/10/emulsion | — | — |
| I | powder | Ex. 1a/5/emulsion | — | — |
| J | wet-cake | Ex. 2c/10/wet-cake | — | — |

Sample A represents the run where the procedure of Example 9 was followed. The remaining samples represent procedures where the PVC resin and an additive (impact modifier for all samples except for Sample C where the processing aid components of the siding formulation were replaced with the emulsions of Examples 4 and 5) were first premixed and dried in a fluid bed dryer, then the remaining ingredients were added to the PVC-additive blend in accordance with Example 9. The PVC wet-cake used for Samples A through H was a vinyl chloride homopolymer produced by aqueous suspension polymerization and having a solids level of 80.2%, a K value of 66.5, an aerated bulk density of 0.525 g/cc, a packed bulk density of 0.652 g/cc, a mean particle size of 171 microns (determined by light scattering techniques using a Coulter LS particle size analysis system). The PVC wet-cake used for Sample J was identical, except that it had a solids level of 77.2%.

The preparation of Izod bars, and Izod testing, was performed according to the procedure of Example 9. All testing was carried out at 23° C. The results are reported in Table 7.

TABLE 7

| Sample Used to Make Blend | Impact Modifier/Level/Form | Impact Modifier Type | Entry Point of Impact Modifier | Average Ductile Breaks | Average Izod (J/m) |
|---|---|---|---|---|---|
| A | 1ap/5/powder | 80 BA//20 MMA | Blender | 10% | 304 |
| C | 1ap/5/powder | 80 BA//20 MMA | Blender | 50% | 725 |
| F | 1a/5/emulsion | 80 BA//20 MMA | Dryer | 0% | 195 |
| I | 1a/5/emulsion | 80 BA//20 MMA | Dryer | 10% | 315 |
| H | 1a/10/emulsion | 80 BA//20 MMA | Dryer | 90% | 1226 |
| G | 1d/5/emulsion | 90 BA//10 MMA | Dryer | 0% | 210 |
| B | 3a/5/emulsion | MBS | Dryer | 50% | 727 |
| D | 2d/5/powder | 88 BA//12 MMA | Dryer | 90% | 1125 |
| E | 2b/5/emulsion | 88 BA//12 MMA | Dryer | 10% | 313 |
| J | 2c/10/wet-cake | 88 BA//12 MMA | Dryer | 90% | 1155 |

As illustrated in Table 7, premixing the resin (in either powder or wet-cake form) with an aqueous additive can provide equivalent or improved results compared to formulating blends in the traditional fashion using powder-form additives.

Example 12

This example further illustrates the mixing flexibility provided by using aqueous additive systems within the scope of the present invention. Using the standard siding substrate formulation of Table 2 with impact modifier levels of 8-12 phr, a masterbatch, containing all ingredients except the impact modifier, was prepared using a 1 ton Henschel blender. The impact modifier was then blended with the masterbatch using a "BUSS KNEADER" model MDK/E 46 (46 mm), connected to a GS 70 single screw crosshead extruder, in turn connected to a LWG 70 multiple hole die hot face pelletizer. The kneader was run in two different configurations.

Configuration A (Used Only for Powder-Form Additive):

The Length to Diameter ratio (L/D) of the kneader was 7. Impact modifier powders were pre-blended with the masterbatch before introduction to the kneader. The kneader was connected to a crosshead extruder, which was in turn connected to a multiple hole die hot face pelletizer. Small, semispherical, approximately 15 mm diameter pellets were cut, cooled with water, and then conveyed to a collector.

Configuration B (Used for Both Powder and Aqueous Additives):

The Length to Diameter ratio of the kneader was 11. The kneader was equipped with a "CHEMINJECTOR" metering pump (for the addition of aqueous-form additives) halfway down its length. A vacuum port for devolatilization of water was located at the entrance to the crosshead extruder. The applied vacuum was approximately 20 inches of mercury (50.8 cm of Hg). The crosshead extruder was connected to a multiple hole die hot face pelletizer. Small, semi-spherical, approximately 15 mm diameter pellets were cut, cooled with water, and then conveyed to a collector.

Sample plaques were prepared from the compounded pellets by milling the pellets on an electric Collin mill, followed by compression molding and Izod testing as described in Example 9. All Izod measurements were taken at 23° C. The results are presented in Table 8.

TABLE 8

| Impact Modifier | Impact Modifier Comp. | Impact Modifier Level (phr) | Kneader L/D | Average Izods (J/m) | Average Percent Ductile Breaks |
|---|---|---|---|---|---|
| None | — | 0 | 11 | 101 | 0% |
| 1ap | 80 BA// 20 MMA | 8 | 7 | 1298 | 100% |
| 1ap | 80 BA// 20 MMA | 8 | 11 | 1340 | 100% |
| 1a | 80 BA// 20 MMA | 8 | 11 | 1308 | 100% |
| 1e | 92 BA// 8 MMA | 11.4 | 11 | 1351 | 100% |

Example 13

This Example illustrates some advantages to using aqueous additives within the scope of the present invention. The standard siding substrate formulation of Table 2 was prepared using an 8 phr (solids based on equivalent PVC) level of 80 BA//20 MMA impact modifier. The ingredients were blended in an 8 lb (3.6 kg) Henschel blender. Emulsion was added using a small funnel to make the addition through a side port at 82° C. A two inch (5.1 cm) diameter flexible hose connected to a vacuum line was placed over the top of the vented blender. Two side ports were opened to obtain cross-ventilation to prevent condensation on the lid of the blender.

Various powder properties of the formulated blends were measured. The loose bulk density of the blended ingredients, as well as the funnel flow of the blended ingredients were measured by ASTM D 1895-96.

Extruded sheets were prepared from the blended formulation using a KMDL 25 mm extruder run at 30 rpm. The screw temperature setting was 175° C. The two zone barrel temperatures were set at 180° C. and 185° C. respectively. The die temperature was set at 188° C. A four inch (10.2 cm) adjustable lip sheet die was used to make the extruded sheet. The sheet width was 3.5 inches (8.9 cm). The sheet centerline thickness was 0.51 inches (13.0 mm) and the edge thickness was 0.54 inches (13.7 mm). The extruded sheet was then subjected to Gardner (i.e., dropped weight) Impact testing at 23° C. according to ASTM D4226-85 procedure A, using a H.25 impactor with a 0.5 inch (12.7 mm) diameter and a 0.25 inch (6.35 mm) radius hemispherical tip. Gardner impact strengths were measured at both the center of the sheet and approximately 1 inch (2.5 cm) to the right of the center. Averages of ten determinations of Gardner Impact are presented below in Table 9.

TABLE 9

| Impact Modifier | Loose Bulk Density (g/cc) | Funnel Flow (sec) | Power Draw (amps) | Output Rate (kg/hr) | Gardner Impact (J/m) at Center of Sheet | Gardner Impact (J/m) Right Side of Center |
|---|---|---|---|---|---|---|
| 1a | 61.5 | 5.6 | 2.9 | 6.5 | 14418 | 20070 |
| 1ap | 58.1 | 6.0 | 3.4 | 6.0 | 7387 | 15308 |

As illustrated in Table 9, the use of emulsion-form additives presents a number of advantages over the use of a powder-form additive of the same composition. Powder properties are improved when emulsion additives are used, thereby facilitating the most efficient introduction of the blend to the extruder. The extruder draws less energy when processing blends made with emulsion additives, and also is able to process at increased output levels. Finally, the Gardner Impact imparted by the emulsion additive is markedly higher than that imparted by the powder-form additive of identical composition.

Example 14

This example illustrates that aqueous additives within the scope of the present invention are useful in formulations other than the siding formulation of Table 2. The formulations used in this Example are: (1) the Lead-Based Extruded Window Profile Formulation of Table 10; and (2) the Twin-Screw Siding Formulation of Table 11.

TABLE 10

Lead-Based Window Profile Test Formulation

| Component | Product Used/Source | Level (phr) |
|---|---|---|
| PVC resin (K = 68) | "EVIPOL" SH 6830/European Vinyls Corp. | 100.00 |
| Di-basic Pb Phosphite | "NAFTOVIN" T90/Chemson | 3.00 |
| Neutral Pb Stearate | "LISTAB" 51/Chemson | 0.70 |
| Di-basic Pb Stearate | "LISTAB" 28/Chemson | 0.30 |
| Calcium Stearate | "CEASIT" 1/Barlocher | 0.30 |
| Neutral dicarboxylic acid ester of saturated fatty alcohols | "LOXIOL" G61/Henkel | 0.40 |
| Neutral ester wax | "LOXIOL" G32/Henkel | 0.50 |
| High Density Oxidized Polyethylene | AC307A/Allied-Signal | 0.05 |
| Titanium dioxide | RTC30/Tioxide | 4.00 |
| Calcium Carbonate (coated) | "OMYALIT" 95T/OMYA, Inc. | 5.00 |
| Acrylic Lubricating Processing Aid | Example 4c | 0.50 |
| Impact Modifier | — | 7.00 |

TABLE 11

Twin-Screw Siding Formulation

| Component | Product Used/Source | Level (phr) |
|---|---|---|
| PVC | "GEON" PVC (K = 67)/Geon | 100 |
| Tin Stabilizer | "ADVASTAB" TM-181/Morton Specialty Chemical Products | 1.6 |
| Lubricant (Calcium Stearate) | Calcium Stearate (Regular)/Witco Corp. | 1.3 |
| Paraffin Wax | "HOSTABLUB" XL-165/Clariant | 1.0 |
| Acrylic Processing Aid | "PARALOID" K-120ND/Rohm and Haas | 0.5 |
| Acrylic Lubricating Processing Aid | Example 4c | 1.0 |
| Impact Modifier | — | 7.0 |
| TiO$_2$ Pigment | "ZOPAQUE" RCL4/Omya | 10.0 |

A. The window profile formulation of Table 10 was prepared in a Papenmeier blender, heated by friction to 120° C. The PVC, di-basic Pb Phospite, neutral Pb stearate, di-basic Pb stearate, calcium stearate, dicarboxylic acid ester, neutral ester wax, oxidized polyethylene and emulsion or wet-cake form impact modifiers (when used) were all added to the blender at a temperature of about 23° C. The remaining components (including powder-form impact modifiers, when used) were added to the blender at a temperature of about 100° C. When the impact modifier was added in emulsion or wet-cake form, the blender was ventilated by connecting a hose to a port on the cover of the blender, through which a slight vacuum was pulled. The blends were then extruded to form a window frame profile using a two-zone KMDL 25 mm extruder operating at a screw speed of 30 rpm. Barrel temperatures were set at 160° C. for zone 1 and 185° C. for zone 2. The die (exit) temperature setpoint was 195° C.

The extruded profiles were tested for impact strength at 0° C. according to standard tests ISO R 179 (single V notch) and DIN 53753 (double V notch). Actual sample thickness was 3.01+/−0.12 mm. The results of this testing are presented in Table 12.

TABLE 12

| Impact Modifier | BA//MMA Levels | Level of Impact Modifier (phr) | Impact Strength ISO R 179 (kJ/m$^2$) | Impact Strength DIN 53753 (kJ/m$^2$) |
|---|---|---|---|---|
| 1a  | 80//20 | 8 | 15.1 | 35.8 |
| 1ap | 80//20 | 8 | 13.8 | 32.1 |
| 1f  | 95//5  | 7 | 13.1 | 27.2 |
| 2c  | 88//12 | 7 | 13.6 | 30.1 |
| 2d  | 88//12 | 7 | 13.0 | 27.5 |

In addition to showing that emulsion-form additives perform as well as, or better than, powder-form additives, this table (through the data regarding additive 2c) further shows that aqueous-form additives that take the form of wet-cake also provide excellent impact properties to the matrix resin.

B. The twin-screw siding formulation of Table 11 was prepared by forming a masterbatch of all the ingredients, except for the impact modifier, in a 35 lb (16 kg) Henschel blender operating at approximately 1000 rpm, which was heated by the friction generated by mixing/high speed rotation. The PVC resin was added to the mixer at 23° C., the tin stabilizer was added at 52° C., the calcium stearate and paraffin wax were added at 66° C., the processing aids were added at 77° C. and the pigment was added at 88° C. Heating continued until the temperature of the masterbatch reached 100° C., at which point the masterbatch was transferred to another vessel and cooled. To 300 gram aliquots of this masterbatch, each of the tested impact modifier emulsions was added (in amounts to equal 7 phr impact modifier, accounting for water content) at room temperature and stirred in with a spatula. The blends were allowed to air dry to remove moisture.

Samples were milled at 175° C. using an oil heated Collin mill and molded according to the procedure of Example 9, except that the molding temperature used was 190° C.

Izod measurements at various temperatures were made according to ASTM D 256 as described in Example 9. The results, reported in Table 13, are the average of 20 Izod measurements (ten measurements made on two separate plaques, both aligned in the machine milling direction).

TABLE 13

| Impact Modifier | Impact Modifier Comp. | Izod Measurement Temp. (° C.) | % Ductile Breaks | Average Izods (J/m) |
|---|---|---|---|---|
| 1a | 80 BA//20 MMA | 15 | 5% | 265 |
| 1a | 80 BA//20 MMA | 17 | 50% | 734 |
| 1a | 80 BA//20 MMA | 19 | 80% | 1110 |
| 1d | 90 BA//10 MMA | 15 | 65% | 850 |
| 1d | 90 BA//10 MMA | 17 | 75% | 1045 |
| 1d | 90 BA//10 MMA | 19 | 75% | 1017 |
| 1f | 95 BA//5 MMA | 15 | 70% | 1104 |
| 1f | 95 BA//5 MMA | 17 | 85% | 1173 |
| 1f | 95 BA//5 MMA | 19 | 100% | 1372 |
| 2a | 100 BA//0 MMA | 15 | 10% | 302 |
| 2a | 100 BA//0 MMA | 17 | 70% | 929 |
| 2a | 100 BA//0 MMA | 19 | 40% | 570 |

Example 15

Examples 15 and 16 illustrate that aqueous additives within the scope of the present invention can be used as processing aids, and impart excellent processability to a matrix resin.

The standard substrate formulation of Table 2 was used to prepare blends, with impact modifier levels of 5 phr, that varied the form (i.e., powder versus emulsion) of both impact modifier and processing aids. When emulsion-form processing aids were used, the compositions of Examples 4b, 5 and/or 7 were substituted for the processing aids provided in Table 2. The blends were made according to procedure set out in Example 9. The fusion behavior of the blends (an indicator of processability) was then determined using a Haake Rheocord 90 torque rheometer with a Rheomix 600 bowl and roller rotors. A 57 gram charge of the mixed powders were added to the bowl (samples E and F used a 59 gram charge), which was heated to 185° C. and run at a rotor speed of 50 rpm. Fusion time is defined as the interval between the initial load torque peak and the fusion torque peak. Degradation time is defined as the interval between charging the sample to the bowl and the point at which the torque rises 200 meter-grams above the torque at 10 minutes. The results of the fusion behavior testing are reported in Table 14, which illustrates that the use of aqueous-form processing aids can reduce the fusion time (i.e., enhance processability) of matrix blends.

TABLE 14

| Sample | Impact Modifier | Processing Aid | Lubricating Processing Aid | Fusion Time (sec.) | Degradation Time (sec.) |
|---|---|---|---|---|---|
| A | —   | Table 2 | Table 2 | 130 | 1708 |
| B | 1a  | Table 2 | Table 2 | 93  | 1448 |
| C | 1ap | Table 2 | Table 2 | 115 | 1365 |
| D | 1ap | 5       | 4b      | 86  | 1250 |
| E | 1ap | 7a      | Table 2 | 111 | 1491 |
| F | 1ap | 7b      | Table 2 | 135 | 1502 |

Example 16

This example illustrates how the present invention allows for the design of novel improved processing aid compositions that do not require an outer "hard" shell. Using the Processing Test Formulation of Table 15, blends were made using the various compositions of Example 4 as the lubricating processing aid component.

TABLE 15

Processing Test Formulation

| Component | Product Used/Source | Level (phr) |
|---|---|---|
| PVC resin | "OXY" 185/Oxy | 100.0 |
| Tin Stabilizer | "ADVASTAB" TM-181/Morton Specialty Chemical Products | 1.5 |
| Glycerol monostearate | "ALDO" MS/Lonza | 0.5 |
| Wax | OP Wax/Clariant | 0.2 |
| Lubricating Processing Aid | | 0.5-1.0 |

Blends were prepared in a 35 lb (16 kg) Henschel blender operated at approximately 1000 rpm heated by friction to a temperature of 100° C. A masterbatch of the blend was prepared by combining the first four ingredients of the formulation. The PVC was added to the blender at a temperature of 23° C. The tin stabilizer was added to the blender at 52° C. The glycerol monostearate and wax were added to the blender at 66° C. Heating continued to 100° C. at which point the masterbatch was transferred to a second vessel and cooled. An appropriate amount of emulsion-form lubricating processing aid was added to aliquots of the masterbatch, and stirred in with a spatula to obtain blends containing either 0.5 or 1.0 phr lubricating processing aid. The blends were allowed to air dry and were then tested for fusion time properties.

Fusion time properties were determined using a Haake Rheocord 90 torque rheometer with a Rheomix 600 bowl and roller rotors. A 60 gram charge of the blend was added to the bowl, which was heated to 170° C. and run at a rotor speed of 60 rpm. The results are reported in Table 16, which illustrates that aqueous-based processing aids perform as well as, or better than, their powder-form analogues. Additionally, the table illustrates that emulsion-form processing aids that do not contain the hard outer shell (necessary for isolation purposes) can be used at half the loading to achieve similar processing results.

TABLE 16

| Processing Aid/Form/Level (phr) | Time to Fusion Peak (sec) | Temp. at Fusion Peak (° C.) | Torque at Fusion Peak (m-g) |
|---|---|---|---|
| 4d/powder/1.0 | 45 | 166 | 2654 |
| 4b/emulsion/1.0 | 38 | 161 | 3172 |
| 4a/emulsion/1.0 | 60 | 165 | 2547 |
| 4a/emulsion/0.5 | 48 | 163 | 2670 |

Example 17

This example illustrates that aqueous-based MBS impact modifiers are useful in applications where the optical properties (i.e., clarity) of the modified resin is important.

A. Using the Clear Formulation of Table 17, blends were made using the additive compositions of Example 6 at levels of 8, 10, and 12 phr.

TABLE 17

Clear Formulation

| Component | Product Used/Source | Level (phr) |
|---|---|---|
| PVC resin (K = 59) | BCP-59/Borden | 100.0 |
| Tin Stabilizer | "ADVASTAB" TM-181/Morton Specialty Chemicals | 1.5 |
| Glycerol monostearate | "ALDO" MS/Lonza | 0.5 |
| Wax | OP Wax/Clariant | 0.2 |
| Processing Aid | "PARALOID" K-120ND/Rohm and Haas | 1.5 |
| blue toner | "OUTREMER" 54B/Reckitt Colors | 0.06 |
| Impact Modifier | | 8.0-12.0 |

The first six ingredients were mixed in a 35 lb (16 kg) Henschel blender operating at approximately 1000 rpm and heated by friction. The PVC was added to the blender at 23° C. The tin stabilizer was added to blender at 52° C. The glycerol monostearate and wax were added to the blender at 66° C. The processing aid was added at 77° C. The blue toner was added (as a 1% mixture in PVC) at 80° C. Heating was continued for this masterbatch until the temperature reached 100° C., after which point the batch was cooled in a second container. The impact modifiers, in either emulsion or powder form, were added in small plastic-coated cups to aliquots of the masterbatch, stirred in, and the resulting blends dried to constant weight at 50° C. in a vacuum oven.

The blended powders were then milled at 177° C. for 3.5 minutes on a 6 inch×13 inch (15.2 cm×33.0 cm) two-roll Collin WW 150 P electric mill. The milled sheet was cut into 4 pieces and pressed at 177° C. for three minutes under 10 tons of force (44,000 kg) followed by maintaining 177° C. for two minutes at 80 tons of force (352,000 kg), followed by cooing for three minutes to room temperature at 80 tons of force (352,000 kg). The plaques were then tested for optical properties using a Hunterlab Ultrascan™ colorimeter. The percent light transmittance was measured using ASTM D 1003-52. The yellowness index and color parameters ("L" and "b") were determined in accordance with ASTM E 313-96, using ASTM D 1925.

The results are reported in Table 18.

TABLE 18

| Impact Modifier/Form | Impact Modifier Level (phr) | Percent Transmittance | L | b | Yellowness Index |
|---|---|---|---|---|---|
| 6c/powder | 8 | 75.4 | 86.9 | -3.7 | -7 |
| 6c/powder | 10 | 75.6 | 87 | -3.2 | -6.1 |
| 6c/powder | 12 | 75.3 | 86.8 | -2.9 | -5.7 |
| 6a/emulsion | 8 | 64.4 | 80.3 | 0.6 | 1.4 |
| 6a/emulsion | 10 | 68.2 | 82.6 | -1.1 | -2.6 |
| 6a/emulsion | 12 | 69 | 83.1 | -1.3 | -3.1 |
| 6b/emulsion | 8 | 69.5 | 83.4 | 4 | 6.4 |
| 6b/emulsion | 10 | 73.9 | 86 | 3.7 | 5.8 |
| 6b/emulsion | 12 | 67.8 | 82.4 | 5.8 | 9.8 |

B. The impact performance of the Example 6 composition was tested using the Clear Formulation of Table 17. The plaques used for these measurements are the same plaques prepared for the optical tests in Example 17A (portions of which had been reserved for impact testing). The impact testing was done according to the procedure detailed in Example 9. The results are reported in Table 19.

TABLE 19

| Impact Modifier/Form | Impact Modifier Level (phr) | Average Izods (J/m) | Average Percent Ductiles |
|---|---|---|---|
| 6c/powder | 8 | 229 | 10% |
| 6c/powder | 10 | 961 | 80% |
| 6c/powder | 12 | 1266 | 100% |
| 6a/emulsion | 8 | 83 | 0% |
| 6a/emulsion | 10 | 681 | delaminated* |
| 6a/emulsion | 12 | 742 | delaminated* |
| 6b/emulsion | 8 | 493 | 40% |
| 6b/emulsion | 10 | 1207 | 100% |
| 6b/emulsion | 12 | 1234 | 100% |

We claim:

1. An additive-matrix mixture formed by mixing ingredients comprising a poly(vinyl chloride)-containing matrix resin and at least one aqueous additive system, wherein each of the at least one aqueous additive systems comprises one polymeric additive selected from the group consisting of:
   i) acrylic impact modifiers;
   ii) methyl methacrylate-butadiene-styrene modifiers; and
   iii) polymeric processing aids;
wherein the amount of polymeric additive in each of the at least one aqueous additive systems is from 5 to 70 percent by weight of the aqueous additive system, and
wherein at least one of the at least one aqueous additive system comprises one polymeric processing aid for poly(vinyl chloride) that comprises 40% to 100%, based on the weight of said polymeric processing aid for poly(vinyl chloride), of an uncrosslinked polymer stage having Tg of 25° C. or higher.

2. The additive-matrix mixture of claim 1, wherein the polymeric processing aid for poly(vinyl chloride) is a lubricating processing aid.

3. The additive-matrix mixture of claim 1, wherein at least one of the at least one aqueous additive system comprises one polymeric processing aid for poly(vinyl chloride) that is a graft copolymer comprising at least 10 percent by weight of a rubbery core, based on the weight of the graft copolymer.

4. The additive-matrix mixture of claim 1, wherein the ingredients comprise an aqueous additive system comprising one polymeric additive synthesized by emulsion polymerization.

5. The additive-matrix mixture of claim 1, wherein the ingredients comprise at least one additive system that is in the form of a coagulated slurry or wet cake.

6. The additive-matrix mixture of claim 1, further comprising at least one compound selected from the group consisting of a plasticizer, a UV stabilizer, a lubricant, a wax, a pigment, a toner, a rheology modifier, a flame retardant, a thermal stabilizer, an antioxidant, a filler, a mold release agent, and hollow spheres.

7. The additive-matrix mixture of claim 1, wherein said matrix resin is in the form of powder, slurry, or wetcake.

* * * * *